United States Patent
Li et al.

(10) Patent No.: US 12,309,019 B2
(45) Date of Patent: May 20, 2025

(54) SECURE AND ENERGY EFFICIENT COMMUNICATION SYSTEM FOR NEXTGEN WIRELESS NETWORKS OVERCOMING HIGH PEAK-TO-AVERAGE POWER RATIO AND DISGUISED JAMMING

(71) Applicant: Board of Trustees of Michigan State University, East Lansing, MI (US)

(72) Inventors: Tongtong Li, Okemos, MI (US); Jian Ren, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 79 days.

(21) Appl. No.: 18/483,040

(22) Filed: Oct. 9, 2023

(65) Prior Publication Data

US 2024/0129176 A1    Apr. 18, 2024

Related U.S. Application Data

(60) Provisional application No. 63/414,627, filed on Oct. 10, 2022.

(51) Int. Cl.
  *H04L 27/36* (2006.01)
  *H04L 27/34* (2006.01)
  (Continued)

(52) U.S. Cl.
  CPC ........ *H04L 27/367* (2013.01); *H04L 27/3411* (2013.01); *H04L 27/38* (2013.01); *H04W 12/03* (2021.01)

(58) Field of Classification Search
  CPC ... H04L 27/367; H04L 27/3411; H04L 27/38; H04W 12/03
  See application file for complete search history.

(56) References Cited

U.S. PATENT DOCUMENTS 7,860,176 B2 * 12/2010 Wu ..................... H04B 17/336
                                              375/349
8,605,836 B2 * 12/2013 Murthy ................ H03G 3/3089
                                              375/345

(Continued)

OTHER PUBLICATIONS

L. Cimini, "Analysis and simulation of a digital mobile channel using orthogonal frequency division multiplexing," *IEEE Transactions on Communications*, vol. 33, No. 7, pp. 665-675, 1985.

(Continued)

*Primary Examiner* — Freshteh N Aghdam
(74) *Attorney, Agent, or Firm* — Harness, Dickey & Pierce, PLC

(57) ABSTRACT

A communication system includes a first device comprising a transmitter transmitting a time domain signal comprising a plurality of symbols originating from a bitstream, a second device comprising a receiver receiving the plurality of symbols in the time domain. The receiver has a fast Fourier transform module performing a fast Fourier transform on the symbols to form a frequency domain signal, a gain control module coupled to the fast Fourier transform module subjecting the frequency domain signal to a gain, an inverse fast Fourier transform module coupled to the gain control module inverse transforming the frequency domain signal to a time domain signal comprising a plurality of symbols and a demapping and channel decoding module forming the bitstream from the plurality of symbols.

20 Claims, 10 Drawing Sheets

| Const. | PSK | 16-QAM | 64-QAM | 256-QAM | 1024-QAM |
|---|---|---|---|---|---|
| PAPR | 0dB | 2.5527dB | 3.6798 dB | 4.2276 dB | 4.4997 dB |

(51) Int. Cl.
 H04L 27/38 (2006.01)
 H04W 12/03 (2021.01)

(56) References Cited

U.S. PATENT DOCUMENTS

| | | | | |
|---|---|---|---|---|
| 2010/0034327 | A1* | 2/2010 | Rimini | H03G 3/3052 375/345 |
| 2010/0080265 | A1* | 4/2010 | Moffatt | H04L 27/2602 375/135 |
| 2010/0215129 | A1* | 8/2010 | Conte | G06F 17/142 375/340 |
| 2023/0318900 | A1* | 10/2023 | Bar-Or Tillinger | H04L 1/0003 375/262 |

OTHER PUBLICATIONS

J. Bingham, "Multicarrier modulation for data transmission: an idea whose time has come," IEEE Communications Magazine, vol. 28, No. 5, pp. 5-14, 1990.

"IEEE standard for information technology—telecommunications and information exchange between systems—local and metropolitan area networks—specific requirements—part 11: Wireless LAN medium access control (MAC) and physical layer (PHY) specifications," IEEE Std 802.11-2020 (Revision of IEEE Std 802.11-2016), pp. 1-4379, 2021.

T. J. Xia, S. Gringeri, and M. Tomizawa, "High-capacity optical transport networks," IEEE Communications Magazine, vol. 50, No. 11, pp. 170-178, 2012.

M. Stojanovic, "Low complexity OFDM detector for underwater acous- tic channels," in Oceans 2006, 2006, pp. 1-6.

Y. Rahmatallah and S. Mohan, "Peak-to-average power ratio reduction in OFDM systems: A survey and taxonomy," IEEE Communications Surveys Tutorials, vol. 15, No. 4, pp. 1567-1592, 2013.

G. Rojo and M. Stojanovic, "Peak-to-average power ratio (PAR) reduc- tion for acoustic OFDM systems," in Oceans 2009, 2009, pp. 1-7.

C. Fengjuan, Y. Hui, and G. Yue-hong, "A new method in PTS to reduce the peak-to-average power ratio in MIMO-OFDM system," in 2009 2nd IEEE International Conference on Computer Science and Information Technology, 2009, pp. 279-282.

C. Park and T. S. Rappaport, "Short-range wireless communications for next-generation networks: UWB, 60 GHz millimeter-wave WPAN, and ZigBee," IEEE Wireless Communications, vol. 14, No. 4, pp. 70-78, 2007.

M. Sun, Q. Song, B. Li, L. Zhao, and C. Zhao, "Nonlinear estimation for 60GHz millimeter-wave radar system based on Bayesian particle filter- ing," EURASIP Journal on Wireless Communications and Networking, vol. 33, 2013.

X. Li and L. Cimini, "Effects of clipping and filtering on the performance of OFDM," IEEE Communications Letters, vol. 2, No. 5, pp. 131-133, 1998.

T. Wilkinson and A. Jones, "Minimisation of the peak to mean envelope power ratio of multicarrier transmission schemes by block coding," in 1995 IEEE 45th Vehicular Technology Conference. Countdown to the Wireless Twenty-First Century, vol. 2, 1995, pp. 825-829 vol. 2.

A. Jayalath and C. Tellambura., "Reducing the peak-to-average power ratio of orthogonal frequency division multiplexing signal through bit or symbol interleaving," Electronics Letters, vol. 36, No. 13, p. 1161-1163, 2000.

R. Bauml, R. Fischer, and J. Huber., "Reducing the peak-to-average power ratio of multicarrier modulation by selected mapping," Electronics Letters, vol. 32, No. 22, p. 2056-2057, 1996.

B. Krongold and D. Jones, "PAR reduction in OFDM via active constellation extension," IEEE Transactions on Broadcasting, vol. 49, No. 3, pp. 258-268, 2003.

Y. Tang, W. Shieh, and B. S. Krongold, "DFT-spread OFDM for fiber nonlinearity mitigation," IEEE Photonics Technology Letters, vol. 22, No. 16, pp. 1250-1252, 2010.

W. Shieh and Y. Tang, "Ultrahigh-speed signal transmission over non-linear and dispersive fiber optic channel: The multicarrier advantage," IEEE Photonics Journal, vol. 2, No. 3, pp. 276-283, 2010.

T.-A. Truong, M. Arzel, H. Lin, B. Jahan, and M. Jeǒzeǒquel, "DFT precoded OFDM-an alternative candidate for next generation PONs," Journal of Lightwave Technology, vol. 32, No. 6, pp. 1228-1238, 2014.

Z. Wang and G. B. Giannakis, "Wireless multicarrier communications," IEEE signal processing magazine, vol. 17, No. 3, pp. 29-48, 2000.

Z. Wang, X. Ma, and G. Giannakis, "OFDM or single-carrier block transmissions?" IEEE Transactions on Communications, vol. 52, No. 3, pp. 380-394, 2004.

F. Pancaldi, G. M. Vitetta, R. Kalbasi, N. Al-Dhahir, M. Uysal, and H. Mheidat, "Single-carrier frequency domain equalization," IEEE Sig- nal Processing Magazine, vol. 25, No. 5, pp. 37-56, 2008.

T. Basar, "The gaussian test channel with an intelligent jammer," IEEE Transactions on Information Theory, vol. 29, No. 1, pp. 152-157, 1983.

J. Lee, R. French, and L. Miller, "Error-correcting codes and nonlinear diversity combining against worst case partial-band noise jamming of frequency-hopping mfsk systems," IEEE Transactions on Communica- tions, vol. 36, No. 4, pp. 471-478, 1988.

C. Geng and S. A. Jafar, "Secure GDoF of K-User Gaussian Interference Channels: When Secrecy Incurs No Penalty," IEEE Communications Letters, vol. 19, No. 8, pp. 1287-1290, 2015.

T. Ericson, "Exponential error bounds for random codes in the arbitrarily varying channel," IEEE Transactions on Information Theory, vol. 31, No. 1, pp. 42-48, 1985.

I. Csiszar and P. Narayan, "The capacity of the arbitrarily varying chan- nel revisited: positivity, constraints," IEEE Transactions on Information Theory, vol. 34, No. 2, pp. 181-193, 1988.

I. Csiszar, "Arbitrarily varying channels with general alphabets and states," IEEE Transactions on Information Theory, vol. 38, No. 6, pp. 1725-1742, 1992.

A. Lapidoth and P. Narayan, "Reliable communication under channel uncertainty," IEEE Transactions on Information Theory, vol. 44, No. 6, pp. 2148-2177, 1998.

T. Song, K. Zhou, and T. Li, "CDMA System Design and Capacity Analysis Under Disguised Jamming," IEEE Transactions on Information Forensics and Security, vol. 11, No. 11, pp. 2487-2498, 2016.

A. Morello and V. Mignone, "DVB-S2: The Second Generation Standard for Satellite Broad-Band Services," Proceedings of the IEEE, vol. 94, No. 1, pp. 210-227, 2006.

Y. Liang, J. Ren, and T. Li, "Secure OFDM system design and capacity analysis under disguised jamming," IEEE Transactions on Information Forensics and Security, vol. 15, pp. 738-752, 2020.

* cited by examiner

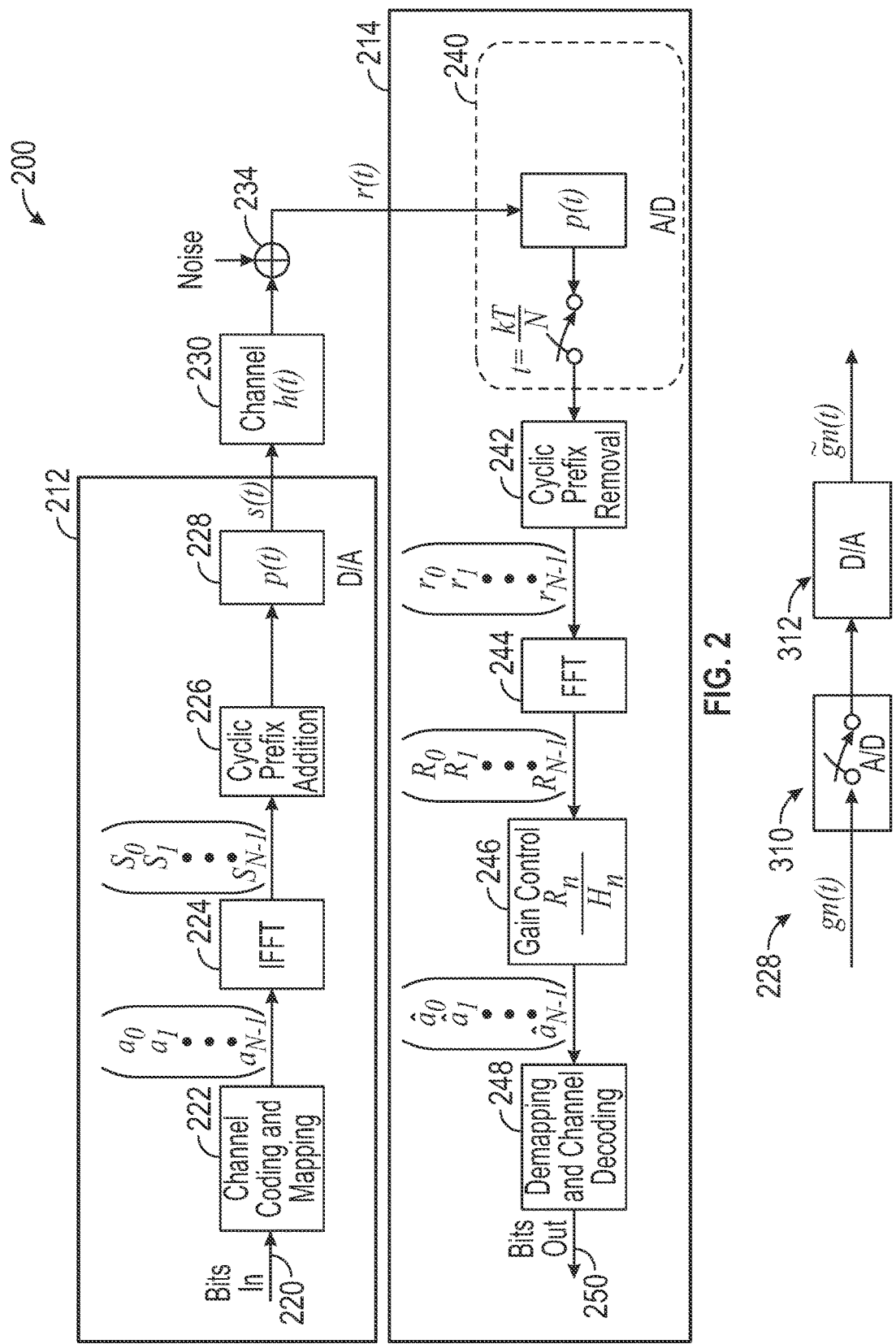

SECURE AND ENERGY EFFICIENT COMMUNICATION SYSTEM FOR NEXTGEN WIRELESS NETWORKS OVERCOMING HIGH PEAK-TO-AVERAGE POWER RATIO AND DISGUISED JAMMING

CROSS-REFERENCE TO RELATED APPLICATION

This application claims the benefit of U.S. Provisional Application No. 63/414,627, filed on Oct. 10, 2022. The entire disclosure of the above application is incorporated herein by reference.

FEDERALLY SPONSORED RESEARCH OR DEVELOPMENT

This invention was made with Government support under Award No. 1919154 awarded by the National Science Foundation. The Government has certain rights in the invention.

FIELD

The present disclosure relates to next generation communication system design using orthogonal frequency division multiplexing and, more specifically to orthogonal frequency division multiplexing using secure precoding, and with the inverse fast Fourier transform being moved to the receiver.

BACKGROUND

This section provides background information related to the present disclosure which is not necessarily prior art.

As a popular modulation technique in wireless communications, OFDM has two major disadvantages—one is its high peak-to-average power ratio (PAPR), which causes nonlinear distortion, lower power efficiency and performance losses; the other is its fragility under hostile jamming attacks, where the authorized user's signal is deliberately interfered by the adversary, leading to communication failures.

Orthogonal Frequency Division Multiplexing (OFDM) has become a key modulation technique for reliable high-speed wireless communication, optical fiber transmission and underwater communication, mainly due to its high spectral efficiency and simple receiver design under multipath propagation. In practical systems, there are two major concerns with OFDM. The first is OFDM has a high peak-to-average power ratio (PAPR). Another concern is the fragility of OFDM under hostile jamming attacks.

High PAPRs occur when the input quadrature amplitude modulation (QAM) or phase-shift keying (PSK) symbols line up constructively in the inverse fast Fourier transform (IFFT) operation at the OFDM transmitter and form peaks in the time domain signal. In Long Term Evolution (LTE) systems, for example, OFDM signal PAPR is approximately 12 dB. High PAPR causes nonlinear distortion and lower power efficiency in the power amplifier. Lower power efficiency leads to lower average transmission power, and nonlinear distortion leads to out-of-band frequency dispersion and inter-carrier interference, both resulting in performance losses and higher hardware design complexity in OFDM systems and raising serious challenges for resource limited IoT devices.

There has been a continuous effort to reduce the PAPR of OFDM. A simple technique is clipping and filtering, where the signal amplitude is clipped to a pre-specified value. While clipping can reduce PAPR, it also causes signal distortion and undesired high frequency items. The latter can be filtered out, but filtering may result in some peak regrowth. Module coding is another technique for PAPR reduction. The basic idea is that for each data module, the codeword with the lowest PAPR is selected through exhaustive search. With this approach, both the transmitter and receiver need to store a large lookup code table whose size increases exponentially with the module size. Along the line of preventing the input symbols being combined constructively in the IFFT operation, interleaving, selective subcarrier mapping, and tone reservations have all been attempted to reduce the PAPR. The input symbol sequence is passed through different random interleavers, and each permuted sequence is fed to an IFFT operator. The PAPR corresponding to the permuted sequences and the original input are then calculated, and the sequence with the lowest PAPR is chosen for transmission. The side information the interleaver uses is sent to the receiver. Similarly, in selective mapping techniques, the transmitter uses different phase sets to change the phase of the original signal, and the phase manipulated or precoded signal that results in the lowest PAPR is selected for transmission. In both interleaving and selected mapping-based approaches, lower PAPR is achieved with the cost of increased computational complexity and the transmission of extra overhead or side information. In the tone reservation approach, a selected set of subcarriers are reserved as control tones (i.e., not used for signal transmission) to reduce the PAPR. The cost, in turn, is the reduced bandwidth efficiency.

PAPR reduction may be achieved through active constellation extension. More specifically, outer constellation points in active (data-carrying) subcarriers are dynamically extended such that the resulting signal has a lower PAPR. In this approach, addition transmit power is required to reduce the PAPR. DFT-pre-coded OFDM, also known as DFT-spread OFDM, was proposed for PAPR reduction. The idea is to divide the whole OFDM band into several sub-bands, then pre-code the data carried by the subcarriers on each subband with a discrete Fourier transform (DFT) matrix before feeding the data to the IFFT module. DFT-spread OFDM has been adopted in LTE uplink transmission.

SUMMARY

This section provides a general summary of the disclosure and is not a comprehensive disclosure of its full scope or all of its features.

The present disclosure is a system having an IFFT-Relocated OFDM (IR-OFDM), which is essentially a single-carrier system with frequency domain equalization. By relocating the IFFT module in OFDM from the transmitter to receiver, IR-OFDM can completely liberate OFDM from the barriers of high PAPR while achieving the same spectral efficiency. In addition, to combat hostile jamming, especially disguised jamming where the jamming is highly correlated with the authorized signal, a securely pre-coded IR-OFDM (SP-IR-OFDM) is set forth. By integrating AES into IR-OFDM transceiver design, a random (or dynamic) constellation is achieved. The shared secure randomness introduced by AES breaks the symmetry between the authorized signal and the jamming interference, and hence ensures reliable performance of the system under disguised jamming. The efficiency and robustness of IR-OFDM and SP-IR-OFDM are demonstrated through simulation examples. It is shown that IR-OFDM can deliver comparable or better performances than OFDM under multipath propagation, and SP-IR-OFDM can achieve strong resistance under disguised jamming while enjoying low PAPR and relatively high spectral efficiency. The results indicate that SP-IR-OFDM can serve as a promising modulation candidate for next generation secure and energy-efficient high-speed communications, especially for the resource-constrained IoT networks.

In one aspect of the disclosure, a communication system includes a first device comprising a transmitter transmitting a time domain signal comprising a plurality of symbols originating from a bitstream, a second device comprising a receiver receiving the plurality of symbols in the time domain. The receiver has a fast Fourier transform module performing a fast Fourier transform on the symbols to form a frequency domain signal, a gain control module coupled to the fast Fourier transform module subjecting the frequency domain signal to a gain, an inverse fast Fourier transform module coupled to the gain control module inverse transforming the frequency domain signal to a time domain signal comprising a plurality of symbols and a demapping and channel decoding module forming the bitstream from the plurality of symbols.

In another aspect of the disclosure, a transceiver includes a transmitter transmitting a time domain signal secured with a key comprising a plurality of symbol originating from a bitstream. A receiver receives a received signal comprising the plurality of symbols in the time domain. The receiver includes a fast Fourier transform module performing a fast Fourier transform on the symbols to form a frequency domain signal, a gain control module coupled to the fast Fourier transform module subjecting the frequency domain signal to a gain, an inverse fast Fourier transform module coupled to the gain control module inverse transforming the frequency domain signal to a time domain signal comprising a plurality of symbols, a secure decoding module decrypting the time domain signal to form a decrypted signal, a demapping and channel decoding module forming the bitstream from the plurality of symbols in the decrypted signal.

In yet another aspect of the disclosure, a method of communicating transmitting a time domain signal comprising a plurality of symbols originating from a bitstream, receiving the symbols in the time domain at a receiver by changing the time domain signal to a frequency domain signal in a fast Fourier transform module, applying a gain to the frequency domain signal from a gain control module coupled to the fast Fourier transform module in the receiver, applying an inverse fast Fourier transform to obtain a time domain signal comprising a plurality of symbols; and demapping and channel decoding the time domain signal to form the bitstream from the plurality of symbols.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 2 is a block diagrammatic view of a traditional OFDM system.

FIG. 3 is a block diagrammatic view of an A/D converter in series with a D/A converter.

Corresponding reference numerals indicate corresponding parts throughout the several views of the drawings.

DETAILED DESCRIPTION

Example embodiments will now be described more fully with reference to the accompanying drawings.

Figure 1:
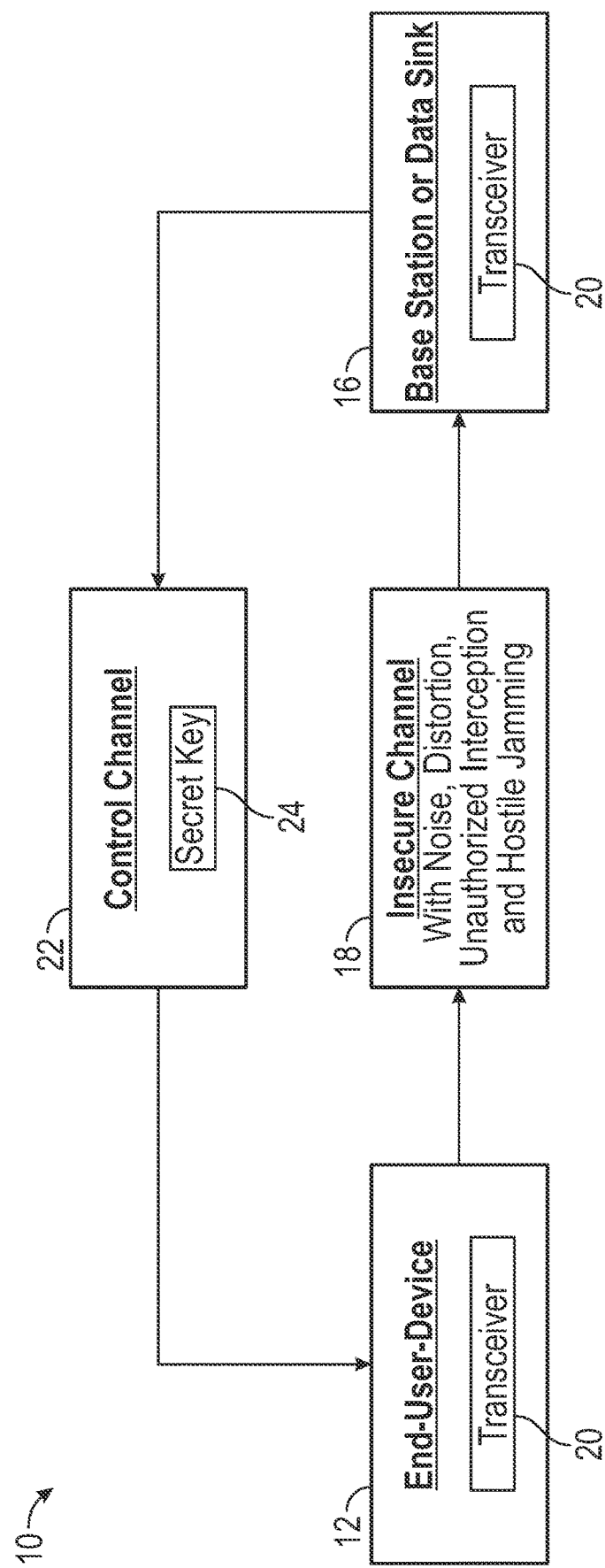
FIG. 1 is a high-level diagrammatic view of the communication system according to the present disclosure.

Referring now to FIG. 1, a high-level block diagram of a communication system 10 showing an end user device 12 in communication with a data sink, a base station 16 (hereinafter base station 16) or another user device through an insecure channel 18. In an actual implementation a plurality of user devices, a plurality of base stations or data sinks intercommunicate. The insecure channel 18 may have noise and distortion. Further unauthorized interception and hostile jamming may take place on the insecure channel. Both the end user device 12 and the base station 16 may have a secure and energy efficient transceiver 20 having a transmitter and a receiver as described in greater detail below.

The insecure channel 18 referred to above is a data channel. A control channel 22 may also allow communication between the base station 16 or data sink and the end-user device. The control channel 22 periodically communicates a security or encryption key 24 used for encryption and decryption of the signals as described below. The Advanced Encryption Standard (AES) may be used in the formation and exchange of the key. The transmitter of one device communicates with the receiver of another device and vice versa.

With the previous techniques discussed above, the PAPR can be reduced to approximately 8 dB~10 dB, subject to the constellation used and the cost on computational complexity and performance losses. As described herein, the PAPR in OFDM may be further reduced than in previous techniques.

The IFFT-Relocated OFDM (IR-OFDM) of the present disclosure is essentially a single-carrier system with frequency domain equalization. It can achieve exactly the same low PAPR as the input symbol sequence. In particular, for constant modulus modulations, the PAPR can be reduced to 0 dB. At the same time, IFFT-Relocated OFDM enjoys simple transceiver design and utilizes only one FFT/IFFT pair and has the same spectral efficiency as traditional OFDM. Moreover, since IR-OFDM is essentially a single-carrier system, it is more robust to frequency and phase offsets than traditional OFDM, where intercarrier interference due to frequency and phase offsets is a significant challenge. It is worthy to note that in IR-OFDM, both FFT and IFFT are implemented at the receiver end, resulting in extremely simple and efficient transmitter design. This makes IR-OFDM a particularly attractive candidate for resource limited 5G/6G IoT systems, where one of the major tasks is information collection.

However, IR-OFDM is as fragile as traditional OFDM under hostile jamming, in which the authorized user's signal is deliberately interfered with by the adversary. In wireless systems, jamming is one of the most commonly used techniques for limiting the effectiveness of an opponent's communication. Along with the wide spread of various wireless devices, especially with the advent of user configurable intelligent devices, jamming attack is no longer limited to battlefield or military related events, but has become an urgent and serious threat to civilian communications and IoT systems as well.

Jamming has widely been modeled as Gaussian noise. Based on the noise jamming model and Shannon's channel capacity formula, it has long been believed that jamming is really harmful only when the jamming power is much higher than the signal power. However, this is only partially true. Based on the arbitrarily varying channel model, recent studies indicate that disguised jamming, where the jamming is highly correlated with the signal, can be much more destructive than noise jamming. Due to its high similarity with authorized signal, disguised jamming can mislead the receiver and reduce the system capacity to zero even when the jamming power equals the signal power.

Existing studies reveal that the worst problem brought by disguised jamming is the symmetry between the authorized signal and the jamming interference. To design the corresponding anti-jamming system, the main task, therefore, is to break the symmetry between the authorized signal and jamming. For this purpose, encryption or channel coding at the bit level will not really help since the symmetry appears at the symbol level. That is, instead of using a fixed symbol constellation, secure randomness is introduced into to the system, and utilize a dynamic constellation scheme, such that the jammer can no longer mimic the authorized user's signal.

In the present disclosure, the a securely pre-coded IR-OFDM is set forth. In general, the phases of transmitted symbols are randomized using the secure pseudo-random sequences generated from the Advanced Encryption Standard (AES) algorithm. The security is guaranteed by the secret key 24 shared only between the legitimate transmitter and receiver. By integrating AES into IR-OFDM transceiver design, a dynamic system is obtained. The shared secure randomness introduced by AES breaks the symmetry between the authorized signal and the jamming interference, and hence ensures reliable performance of securely pre-coded IR-OFDM (SP-IR-OFDM) under disguised jamming. A remarkable feature of the proposed SP-IR-OFDM system is that it can achieve strong resistance to disguised jamming while keeping relatively high spectral efficiency. Moreover, the change to physical layer transceivers is minimal, feasible and affordable.

The efficiency and robustness of IR-OFDM with and without secure precoding were demonstrated through simulation examples. The numerical results indicate that IR-OFDM can deliver comparable or better performances—in terms of bit-error-rate (BER)—than traditional OFDM under multipath propagation. As can be seen, IR-OFDM scheme completely liberates OFDM from the barriers of high PAPR without any additional complexity, storage requirement, or performance losses. Further IR-OFDM and SP-IR-OFDM have similar performance under Gaussian noise jamming. The BER of both system can be improved under Gaussian jamming through strong channel coding, such as low-rate LDPC coding. IR-OFDM is fragile under disguised jamming and the BER cannot be improved through channel coding. On the other hand, SP-IR-OFDM is robust under disguised jamming and can achieve satisfying BER with the assistance of channel coding.

The result implies that, potentially, IR-OFDM and SP-IR-OFDM can serve as promising modulation candidates for next generation energy-efficient high-speed communications, under benign and hostile environments, respectively, especially for resource-constrained Internet of Things (IoT) systems.

Referring now the FIGS. 2 and 3, an implementation of a prior OFDM transceiver system 200 having a transmitter 212 and a receiver 214 is set forth. OFDM is a special kind of orthogonal pulse amplitude modulation (OPAM). The transmitter 212 receives an input data stream or bit stream 220 on which channel encoding and mapping is performed in a channel coding (encoding) and mapping module 222. Channel encoding also adds redundancy to the bitstream to eliminate distortion and noise. The added bits and the original bitstream are then mapped. Mapping maps the channel encoded stream to a plurality of input symbols. Let "a"=[a_1, a_2, ..., a_N]^T represent the module or plurality of input symbols. Generally, QAM or PSK symbols are used. Here (•) T denotes the transpose of a matrix, and N is the module size which is generally a power of 2. Let T stand for the symbol interval. For n=0, 1, ..., N−1, let $$g_n(t) = \frac{1}{\sqrt{T}} e^{\frac{j2\pi nt}{T}} w(t),$$

where w(t)=u(t)−u(t−T)—with u(t) being the unit step function—is a rectangular window over the interval [0, T). These N pulses, $\{g_n(t)\}$, are orthonormal and with frequency separation 1/T Hz. The corresponding OPAM signal in one symbol interval can be represented as $$s(t) = \sum_{n=0}^{N-1} a_n g_n(t) = \frac{1}{\sqrt{T}} \sum_{n=0}^{N-1} a_n e^{\frac{j2\pi nt}{T}} w(t).$$

As s(t) consists of superimposed finite-length signals modulated on different carriers, it is also a special case of multicarrier modulation. Note that $\{g_n(t)\}$ are not bandlimited, for low-complexity practical implementation and are replaced with another set of similar pulses $\{\tilde{g}_n(t)\}$ through the back-to-back cascade in a digital to analog converter (D/A) 228 (312) forming an analog signal that is multiplexed at 228. The multiplexed channel 230 is communicated through noise and potential jamming as signified by noise block 234. Essentially the D/A 228 is in series with an A/D converter 310 corresponding to analog to digital (A/D) converter 240 of FIG. 2 that forms a digital signal. The A/D converter 310 and the D/A converter 312 are complementary and have the same operating characteristics so they match each other. The A/D converter 240 is implemented at the receiver side and the pulse shaping filter is generally chosen to be the root-raised cosine pulse, and the corresponding D/A converter 310 is implemented at the receiver side with the matched filter and a sampler.

That is, for n=0, 1, . . . , N−1, where $$\tilde{g}_n(t) = \frac{1}{\sqrt{N}} \sum_{k=0}^{N-1} e^{\frac{j2\pi nk}{N}} p\left(t - \frac{kT}{N}\right),$$

$$\frac{p(t) = \sqrt{\frac{T}{N}} \sin\left(\frac{\pi Nt}{T}\right)}{\pi t} = \sqrt{\frac{N}{T}} \text{sinc}\left(\frac{\pi Nt}{T}\right)$$

is the ideal reconstruction filter for a sample rate of N/T.

With the new pulses $\{\tilde{g}_n(t)\}$, the corresponding OPAM signal in one symbol interval can be represented as $$s(t) = \sum_{n=0}^{N-1} a_n \tilde{g}_n(t)$$

$$= \frac{1}{\sqrt{N}} \sum_{n=0}^{N-1} \sum_{k=0}^{N-1} a_n e^{\frac{j2\pi nk}{N}} p\left(t - \frac{kT}{N}\right)$$

$$= \sum_{k=0}^{N-1} \left[\frac{1}{\sqrt{N}} \sum_{n=0}^{N-1} a_n e^{\frac{j2\pi nk}{N}}\right] p\left(t - \frac{kT}{N}\right).$$

For k=0, 1, . . . , N−1, let $$s_k = \frac{1}{\sqrt{N}} \sum_{n=0}^{N-1} a_n e^{\frac{j2\pi nk}{N}},$$

that is, samples $s_k$ are obtained from symbols $a_n$ through an IFFT 224. Note that $\sqrt{N}$ is used in the IFFT 224 instead of N such that $E\{|s_k|^2\}=E\{|a_n|^2\}$, here $E\{\cdot\}$ stands for the expectation value of the corresponding random variable. Then, $$s(t) = \sum_{k=0}^{N-1} s_k p\left(t - \frac{kT}{N}\right).$$

This is the OFDM modulation, also known as discrete multitone modulation.

Note that although $s_k$ and $a_n$ have the same average power, $s_k$ is more like a Gaussian random variable rather than a uniformly distributed random variable. Comparing with $a_n$, $s_k$ has a much higher peak power and hence a much higher PAPR.

Let $h_k$ denote the equivalent discrete-time channel impulse response between the transmitted samples $s_k$ and received samples $r_k$. Assuming the channel order is L, in the noise-free case, then $$r_k = s_k * h_k = \sum_{l=0}^{L} h_l s_{k-l}.$$

By adding the cyclic prefix $\{s_{N-L}, \ldots, s_{N-1}\}$ in the cyclic prefix module 226 before the N samples $\{s_0, s_1, \ldots, s_{N-1}\}$ at the cyclical prefix module 226, the ordinary convolution is converted to circular convolution. In this case, let $\{H_n\}$ denote the N-point discrete Fourier transform (DFT) of the channel impulse response $\{h_l\}$, l=0, 1, . . . , L, and let $\{R_n\}$ denote the N-point DFT of $\{r_0, r_1, \ldots, r_{N-1}\}$, then $$R_n = H_n a_n, n=0, 1, \ldots, N-1,$$

since $\{a_n\}$ is the DFT of $\{s_{N-L}, \ldots, s_{N-1}\}$. As a result, for n=0, 1, . . . , N−1, $a_n$ can be recovered from R n through the simple gain control module 246

$$a_n = \frac{R_n}{H_n}.$$

As can be seen, OFDM system 200 has very simple receiver design under multipath propagation.

It is well known that high PAPR occurs when the input symbols line up constructively in the IFFT operation at the OFDM transmitter and form peaks in the time domain signal. IFFT 224 and FFT 244 are the core parts in OFDM transceiver design. The IFFT-FFT pair makes it possible to recover the original input symbols through a simple scaling operation. In the previous work on PAPR reduction, the IFFT module in the OFDM transmitter remains untouched, even though it is the cause of the high PAPR. In this example, a cyclic prefix removal module 242 removes the cyclic prefix from the addition module 226. The FFT 244 converts the signal to frequency domain after removing the cyclic prefix. Signal from the FFT 244 is subjected to gain control to recover the symbols. The symbols are demapped and decoded to hopefully recover the bitstream 250.

Figures 4A, 4B:
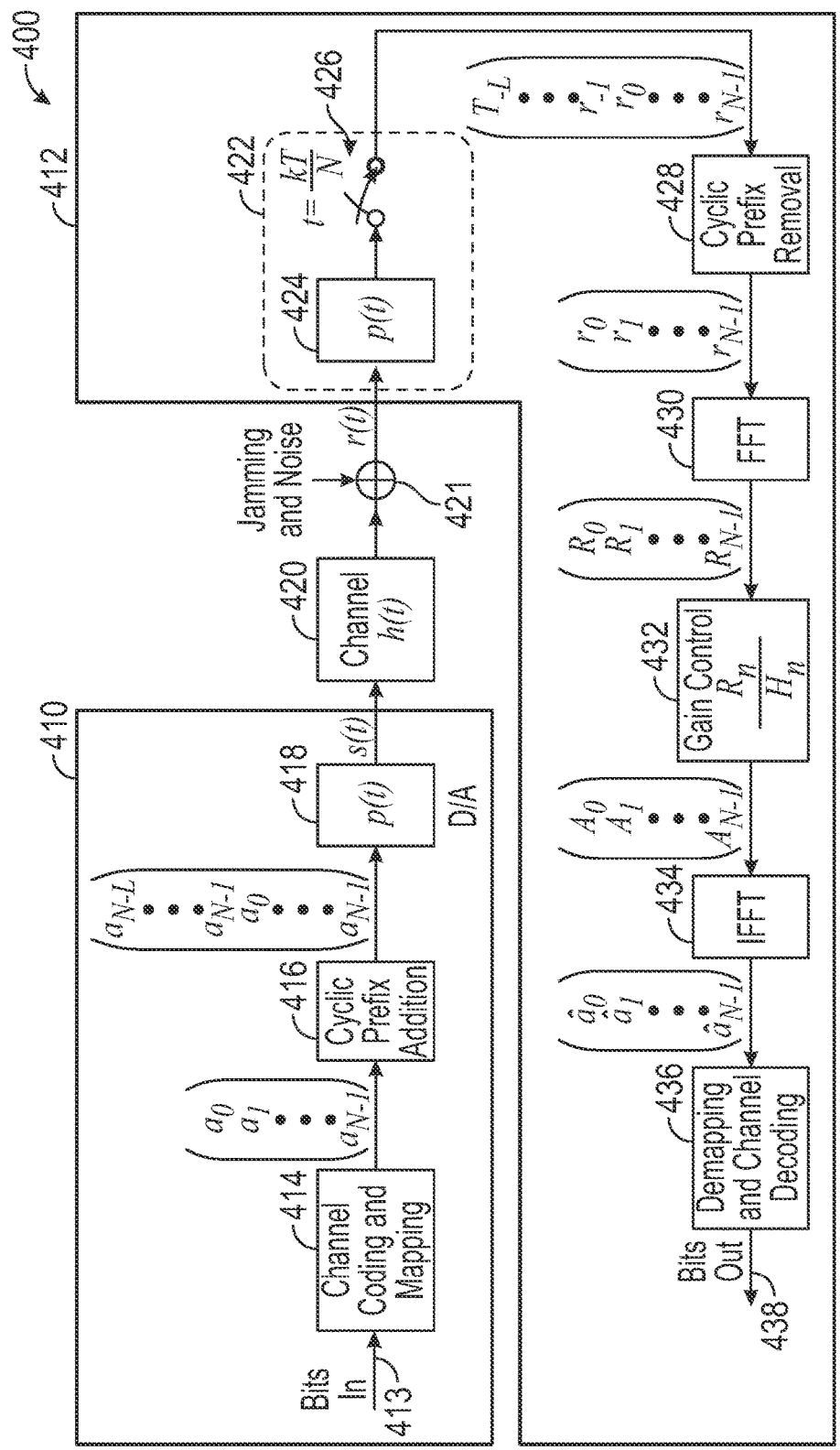
FIG. 4A is a block diagrammatic view of an IFFT-relocated OFDM according to the present disclosure.
FIG. 4B is a table showing PAPR with IFFT-relocated OFDM.

Referring now to FIG. 4A, the IFFT 224 of the OFDM transmitter 212 is relocated to the receiver 412 as IFFT 434 while still allowing the recovery of the original input symbols through a simple scaling operation. In fact, at the transmitter, $$s(t) = \sum_{n=0}^{N-1} a_n p\left(t - \frac{nT}{N}\right).$$

Still, let $\{h_0, h_1, \ldots, h_L\}$ denote the equivalent discrete-time channel impulse response, the received samples $r_n$ can now be represented as $$r_n = a_n * h_n = \sum_{l=0}^{L} h_l a_{n-l}.$$

The channel coding and mapping block 414 operates in a similar manner to that of the channel coding and mapping block 222 illustrated in FIG. 2 and therefore the function is not described in further detail. Essentially, a bit stream 413 is received encoded and mapped into the symbols. The symbols are provided directly to the cyclic prefix addition module 416. The cyclic prefix addition module 416 adds the cyclic prefix in the same manner as 226. However, the cyclic prefix addition module 416 is in communication directly with the channel coding and mapping box 414. The cyclic prefix $\{a_{N-L}, \ldots, a_{N-1}\}$ is added at the cyclic prefix addition module 416 before the N samples $\{a_0 a_1, \ldots, a_{N-1}\}$, again, the ordinary convolution is converted to the circular convolution. Let $\{A_n\}$ denote the N-point DFT of $\{a_0 a_1, \ldots, a_{N-1}\}$, and $\{H_n\}$ the N-point DFT of $\{h_0, h_1, \ldots, h_L\}$, and $\{R_n\}$ the N-point DFT of $\{r_0 r_1, \ldots, r_{N-1}\}$, in the noise-free case, we have $$R_n = H_n A_n, \quad n=0, 1, \ldots, N-1.$$

$A_n$ is recovered rom $R_n$ through $$A_n = \frac{R_n}{H_n},$$

and recover $a_n$ from $A_n$ through the inverse DFT.

The system and method are referred to as IFFT-Relocated OFDM (IR-OFDM). As can be seen, with IR-OFDM, the PAPR problem of OFDM is resolved, and now the PAPR of the system is exactly the same as that of the original input sequence, as shown in the table of FIG. 4B. IR-OFDM requires no precoding, selective mapping, tone reservation or constellation extension, and can achieve exactly the same high spectral efficiency as OFDM. In addition, IR-OFDM improves the power efficiency of traditional OFDM significantly. It also avoids the nonlinear distortion in the power amplifier and hence reduces hardware design complexity.

Moreover, since IR-OFDM is essentially a single-carrier system, it is less sensitive to frequency and phase offsets than the traditional OFDM, where intercarrier interference due to frequency and phase offsets is a significant challenge.

IR-OFDM is simple and effective. The underlying argument is that in the traditional OFDM, the time-domain input signal is treated or twisted as a frequency-domain signal so that FFT can be used at the receiver to convert convolution to multiplication. In IR-OFDM, the input signal is treated as a time-domain signal and show that FFT can still be used at the receiver as in traditional OFDM even if there is no IFFT module at the transmitter.

To this point, the focus is on reliable and efficient data transmission under normal channel conditions, subject to multipath fading and additional noise. However, both OFDM and IR-OFDM are fragile under hostile attacks, especially active attacks like hostile jamming.

Hostile jamming has widely been modeled as Gaussian noise in light of the central limit theorem. Consider the additive white Gaussian noise (AWGN) channel under hostile jamming:

$$r = s + J + w,$$

where s is the authorized signal, J the jamming interference, w the noise independent of J and s, and r the received signal. Based on the noise jamming model and Shannon's capacity formula, the channel capacity is given by $$C = B\log\left(1 + \frac{P_s}{P_w + P_J}\right), \tag{1}$$

where $P_s$ is the signal power, $P_w$ the noise power and $P_J$ the jamming power. From equation (1), under Gaussian jamming the channel capacity is always positive, and an intuitive impression is that jamming is harmful only when the jamming power is much higher than the signal power.

However, this is only partially true. In disguised jamming, where the jamming is highly correlated with the signal, and has a power level close to or equal to the signal power, can be much more destructive than noise jamming. In fact, if the jammer is capable of eavesdropping on the symbol constellation and the codebook of the transmitter, it can simply replicate one of the sequences in the codebook of the legitimate transmitter, the receiver, then, would not be able to distinguish between the authorized sequence and the jamming sequence, resulting in complete communication failure. More specifically, for AWGN channels under disguised jamming, due to the symmetry between the authorized signal and jamming interference, the channel capacity is reduced to C=0. As can be seen, while IF-OFDM can resolve the PAPR problem suffered by the traditional OFDM, it is as fragile as OFDM under disguised jamming.

In FIG. 4A, the D/A converter 418 performs the same function as the D/A converter 228 and generates an analog signal to form the channel 420 h(t). Likewise, the channel module 420 performs the same function in that as channel 230. It should be noted that the signals from the channel module 420 are time domain signals that are communicated through the jamming and noise module 421. The jamming and noise module 421 adds various types of noise and/or interference whether intentional or not intentional. The A/D converter 422 performs the same as that illustrated in FIG. 2 as module 240 and generates a digital signal. The A/D converter is described as having the same characteristics as the D/A converter 418. The receiver in the FIG. 4A has the cyclic prefix removal module 428 that removes the cyclic prefix from the symbols in the time domain signal that is received. A fast Fourier transform module 430 is performed on the received time domain signals and the symbols therein to form a frequency domain signal. The frequency domain signal is communicated to a gain control module 432 that subjects the frequency domain signal to the gain of the gain control module 432. The gain of the gain control module 432 is determined based upon the overhead bits. As mentioned above, the overhead bits are bits that are known by both the transmitter 410 and the receiver 412. When the proper bits are not received at the receiver, the frequency domain signal that is subjected to the gain in the gain control 432 is communicated to the inverse fast Fourier transform module 434. The signal from the inverse fast Fourier transform module 434 is a time domain signal that has the plurality of symbols. The symbols are communicated to the demapping and channel decoding module 436 which are demapped and decoded in a reverse manner to that described above. Eventually, a bit stream 438 that corresponds to the bit stream 413 is generated.

Figure 5:
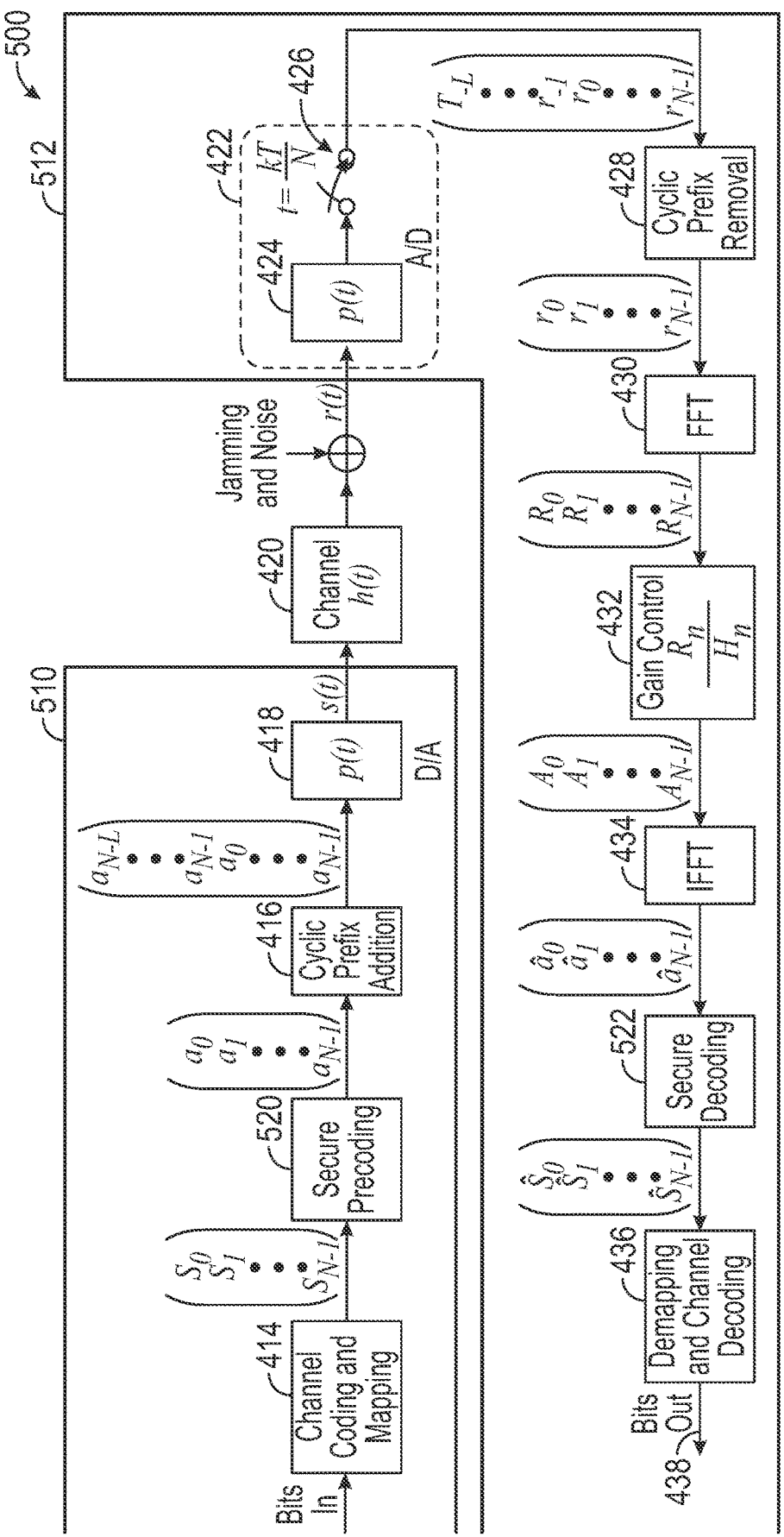
FIG. 5 is a block diagrammatic view of security for a pre-coded and IFFT-relocated OFDM.

Referring now to FIG. 5, to combat disguised jamming, a securely pre-coded IF-OFDM system 500 is set forth. The system 500 has a transmitter 510 and receiver 512. The system 500 breaks the symmetry between the authorized signal and hostile jamming interference by integrating advanced cryptographic techniques into physical layer transceiver design.

The block diagram of the system shown in FIG. 5 is identical to that shown in FIG. 4 with the addition of a secure pre-coding module 520 between the channel coding and mapping module 414 and the cyclic prefix module 416 of the transmitter 510 and a secure decoding module 522 between the IFFT 434 and the de-mapping and channel decoding module 436. In this system 500, however, $s_k$, $k=0, \ldots, N-1$ denote the original symbols from the channel and coding and mapping module 414, and $a_k$, $k=0, \ldots, N-1$ denote the output of the secure precoder 520. Consider one symbol module at a time, and define "s"=$[s\_0, s\_1, \ldots, s\_(N-1)]^\wedge T$ and "a"=$[a\_0, a\_1, \ldots, a\_(N-1)]^\wedge T$, then the secure precoding process is characterized by $$a = Ps.$$

Figure 6:
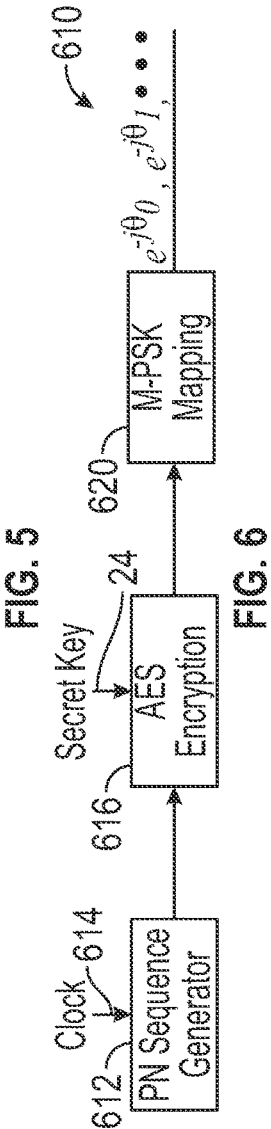
FIG. 6 is a block diagrammatic view of a secure precoding matrix generator used for the secure precoding and secure de-coding block.

Here the precoding matrix "P" is defined as a diagonal matrix $$P = \begin{bmatrix} e^{-j\theta_0} & & & \\ & e^{-j\theta_1} & & \\ & & \ddots & \\ & & & e^{-j\theta_{N-1}} \end{bmatrix}.$$

where $\theta_0, \theta_1, \ldots, \theta_{N-1}$ are generated using the AES-based secure pseudorandom phase generator 610 shown in FIG. 6.

Referring now also to FIG. 6, the PN sequence generator 612 generates a pseudo-random sequence based on a clock signal 614, which is then encrypted with AES at the AES encryption module 616 and is based on a secret key 24 which is shared between the transmitter 510 and the receiver 512. AES is chosen because of its simplicity of design, variable module and key sizes, feasibility in both hardware and software, and resistance against all known attacks. Note that the secure phase generation is not limited to any particular cryptographic algorithm, but it is highly recommended that only thoroughly analyzed cryptographic algorithms are applied.

The encrypted sequence is further converted to PSK symbols using an M-PSK mapper 620, where M is a power of 2, and every $\log_2 M$ bits are converted to a PSK symbol. Note that the larger the M, the higher the uncertainty introduced by the secure precoder. Under additive white Gaussian noise, when M is sufficiently large, the random phase shifts in the secure precoding can be approximated as independent and identically distributed (i.i.d.) random variables that are uniformly distributed over $[0, 2\pi)$.

To facilitate the synchronization process between the transmitter and receiver, the PN sequence generator is initialized in the following way: each party is equipped with a global time clock 614, and the PN sequence generators 612 are reinitialized at fixed intervals. The new state for re-initialization, for example, can be the elapsed time after a specific reference epoch in seconds for the time being, which is public. As the initial state changes with each re-initialization, no repeated PN sequence will be generated. The security, as well as the randomness of the generated phase shift sequence, are guaranteed by the AES encryption algorithm, for which the secret encryption key is only shared between the authorized transmitter and receiver. Hence, the phase shift sequence is random and inaccessible to the jammer.

In the secure precoding module 520, a random phase shift is applied to each transmitted symbol. In this way, a random constellation is formed by introducing shared secure randomness between the transmitter and receiver, which breaks the symmetry between the authorized signal and the jamming interference, and hence can achieve positive channel capacity and ensure reliable performance under disguised jamming. This is demonstrated through simulation examples below. Moreover, it should be noted that if the input symbols sequences are generated from encrypted binary bit streams and the signal-to-jamming-and-noise ratio is reasonably high, then the proposed SP-IR-OFDM will be secure and robust under both eavesdropping (or unauthorized interception) and hostile jamming.

Recall that key management at module 616 for secure precoding is generally performed through the control channel 22 as illustrated in FIG. 1 instead of the insecure data channel 18, the secure precoding process, therefore, does not introduce redundancy into the information stream, and hence SP-IR-OFDM has the same spectral efficiency as IR-OFDM and OFDM in the jamming-free case. As described below, when hostile jamming exists, low-rate channel coding needs to be used jointly with secure precoding for reliable communication under hostile jamming, especially disguised jamming.

Simulation examples show extremely low PAPR, IFFT-Relocated OFDM (IR-OFDM) can achieve comparable BER performance under the same spectral efficiency with that of traditional OFDM. Comparisons of the performance of IR-OFDM with that of securely precoded IR-OFDM (denoted as SP-IR-OFDM) under Gaussian noise jamming and disguised jamming.

Figure 7:
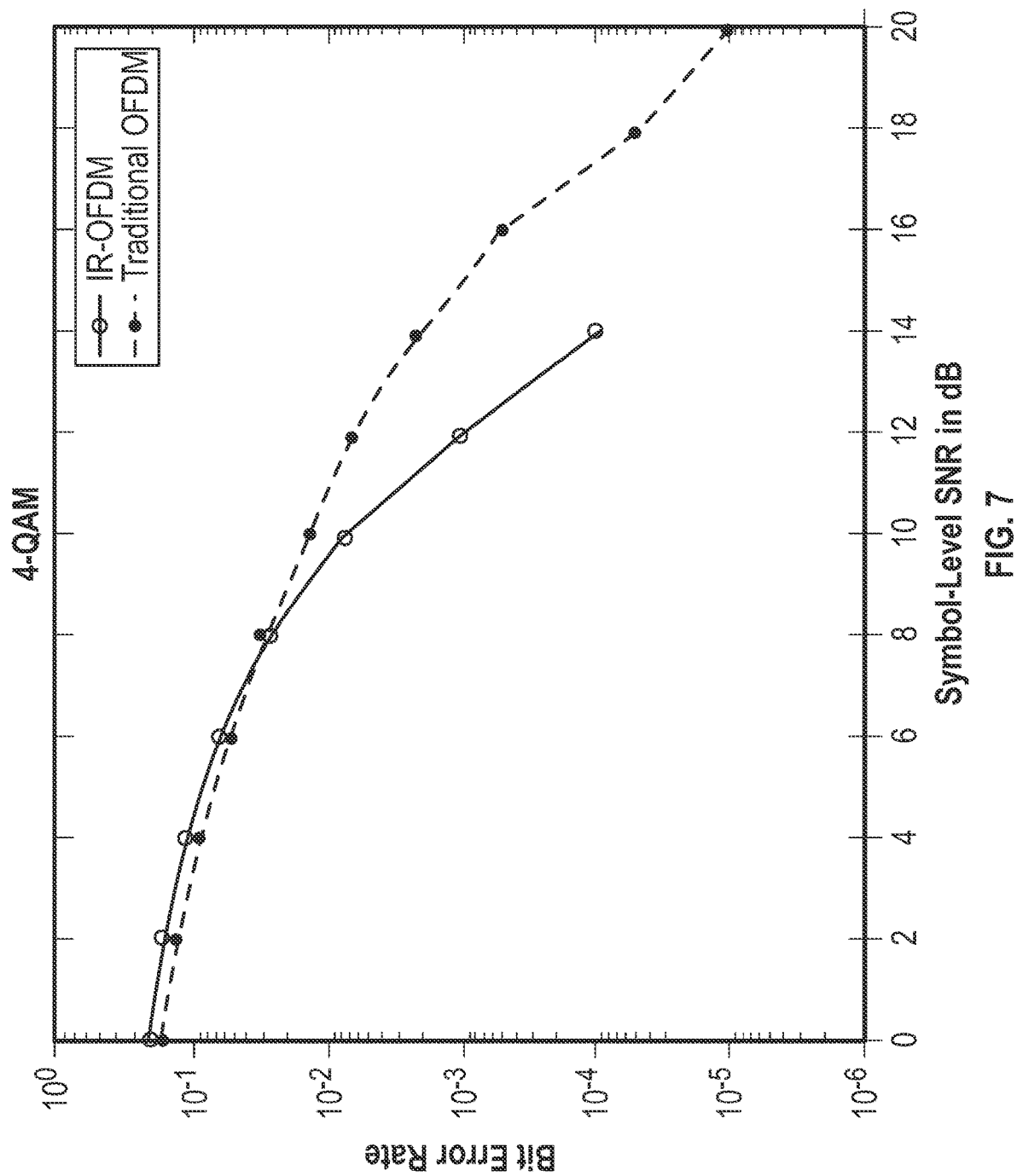
FIG. 7 is a plot of bit array versus symbol level signal to noise ratio for an IFFt-relocated OFDM under Rayleigh channels using four-QAM.
Figure 8:
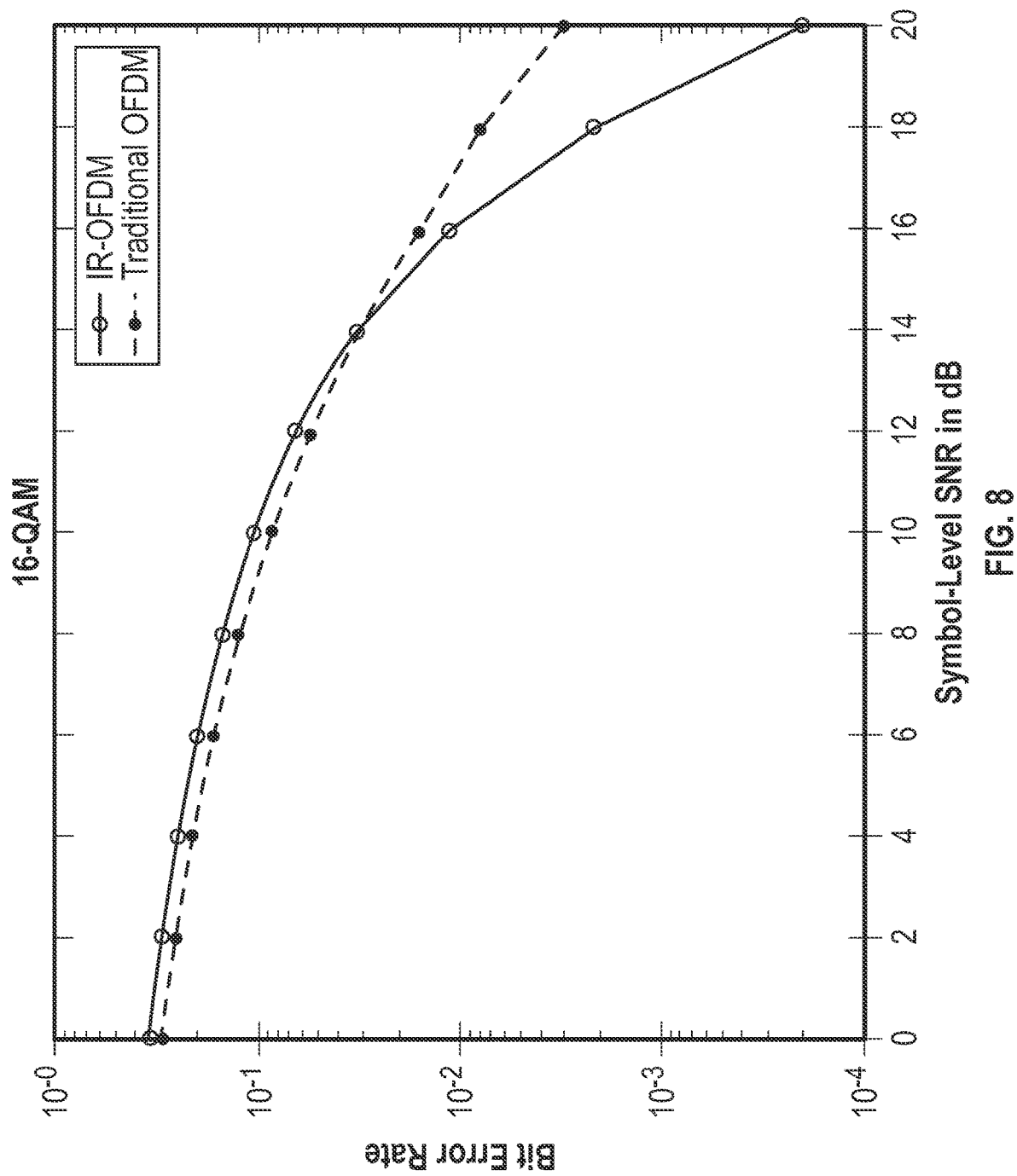
FIG. 8 is a bit array versus symbol level signal to noise ratio for the performance of an IFFT-relocated OFDM versus a traditional OFDM under Rayleigh channels using 16 QAM.

In a first example, a performance comparison of IR-OFDM versus traditional OFDM is set forth. In FIG. 7, the performance of IFFT-Relocated OFDM is demonstrated under Rayleigh fading channels with additive white Gaussian noise and is compared with that of the traditional OFDM. The size of the FFT is chosen to be N=512. The input symbols are generated randomly and the results for the bit-error-rate (BER) is averaged overall 2000 Monto Carlo runs. No channel coding is involved. The simulation results are shown in FIG. 7 and FIG. 8. From the simulation results, it can be seen that for both 4-QAM in FIG. 7 and 16-QAM in FIG. 8, the performance of IR-OFDM is comparable to traditional OFDM when SNR is low, and IR-OFDM outperforms traditional OFDM when the SNR is reasonably high. The underlying argument may be that in traditional OFDM, the IFFT operation at the transmitter generates a Gaussian like constellation, and reduces the minimum distance among the neighboring symbols.

Figure 9:
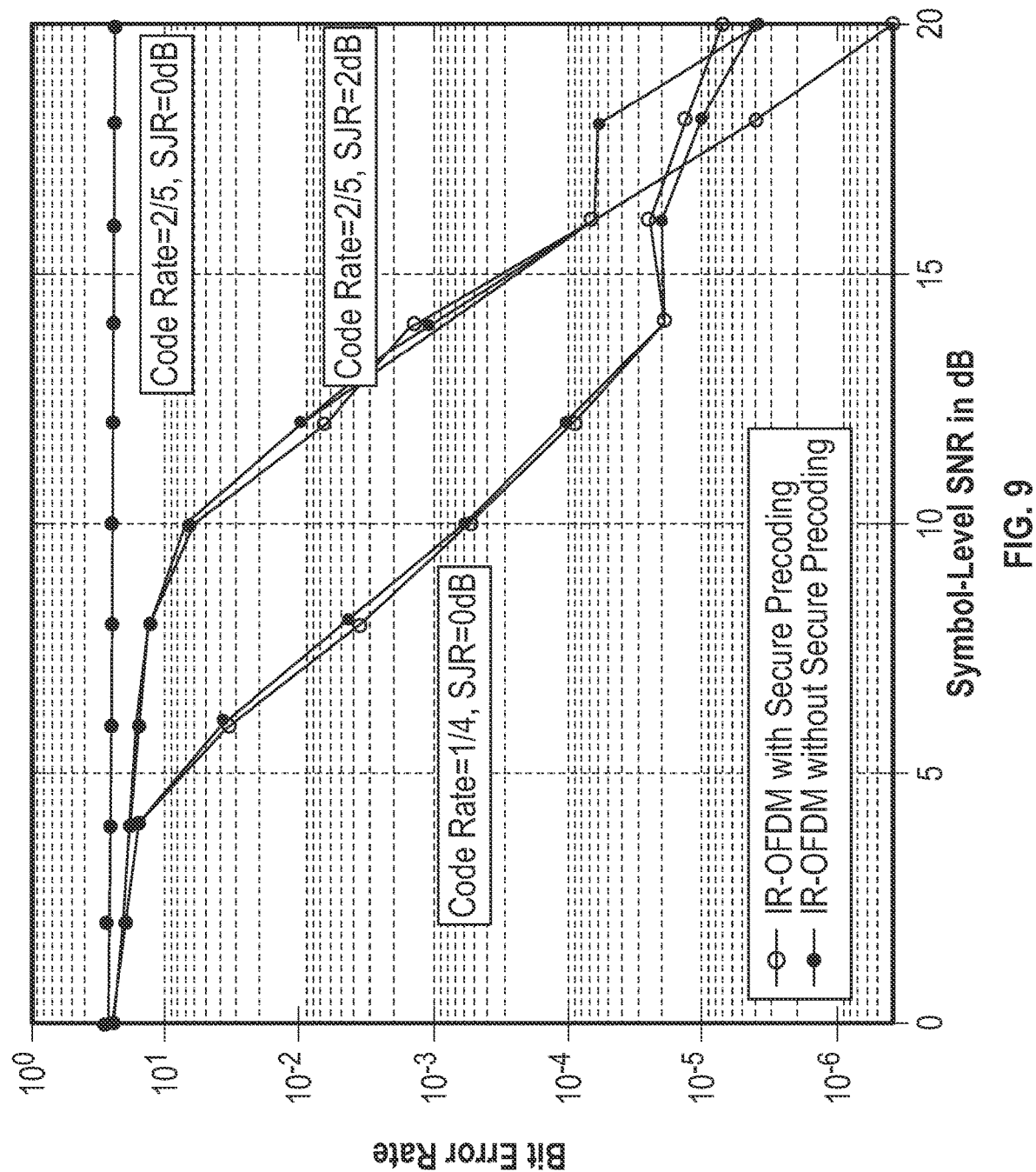
FIG. 9 is the bit error rate versus symbol-level signal to noise ratio for an IFFT-relocated OFDM with and without secure precoding under Gaussian jamming over Rayleigh channels.

Referring now to FIG. 9, a performance comparison of IR-OFDM and Securely Precoded IR-OFDM under Gaussian jamming is provided. In this example, the bit-error-rate (BER) of IR-OFDM and securely precoded IR-OFDM is analyzed under Gaussian noise jamming over Rayleigh channels. Perfect synchronization is assumed, and low-density parity-check (LDPC) codes are used for channel coding, adopting the parity check matrices from the DVB-S.2 standard. The signal-to-jamming ratio (SJR) is set to be 0 dB and 2 dB. Following equation (1), under Gaussian jamming, the channel capacity is always positive, though could be very low when the noise and/or jamming power is high. In particular, when SJR=0 dB and SNR=0 dB, the channel capacity is C=0.2925 bit/symbol; when SJR=0 dB and SNR=10 dB, C=0.4664 bit/symbol; and C→0.5 bit/symbol as SNR→∞. This implies that under noise jamming, with strong channel coding, successful transmission is still possible even when SJR=0 dB. The theoretical analysis is demonstrated through numerical examples, as shown in FIG. 9. It is also shown that when the SJR is increased from 0 dB to 2 dB, a higher code-rate can be used to achieve satisfying BER. Overall, from FIG. 9, it can be seen that under Gaussian noise jamming, IR-OFDM with and without secure precoding have comparable performance over Rayleigh channels.

Figure 10:
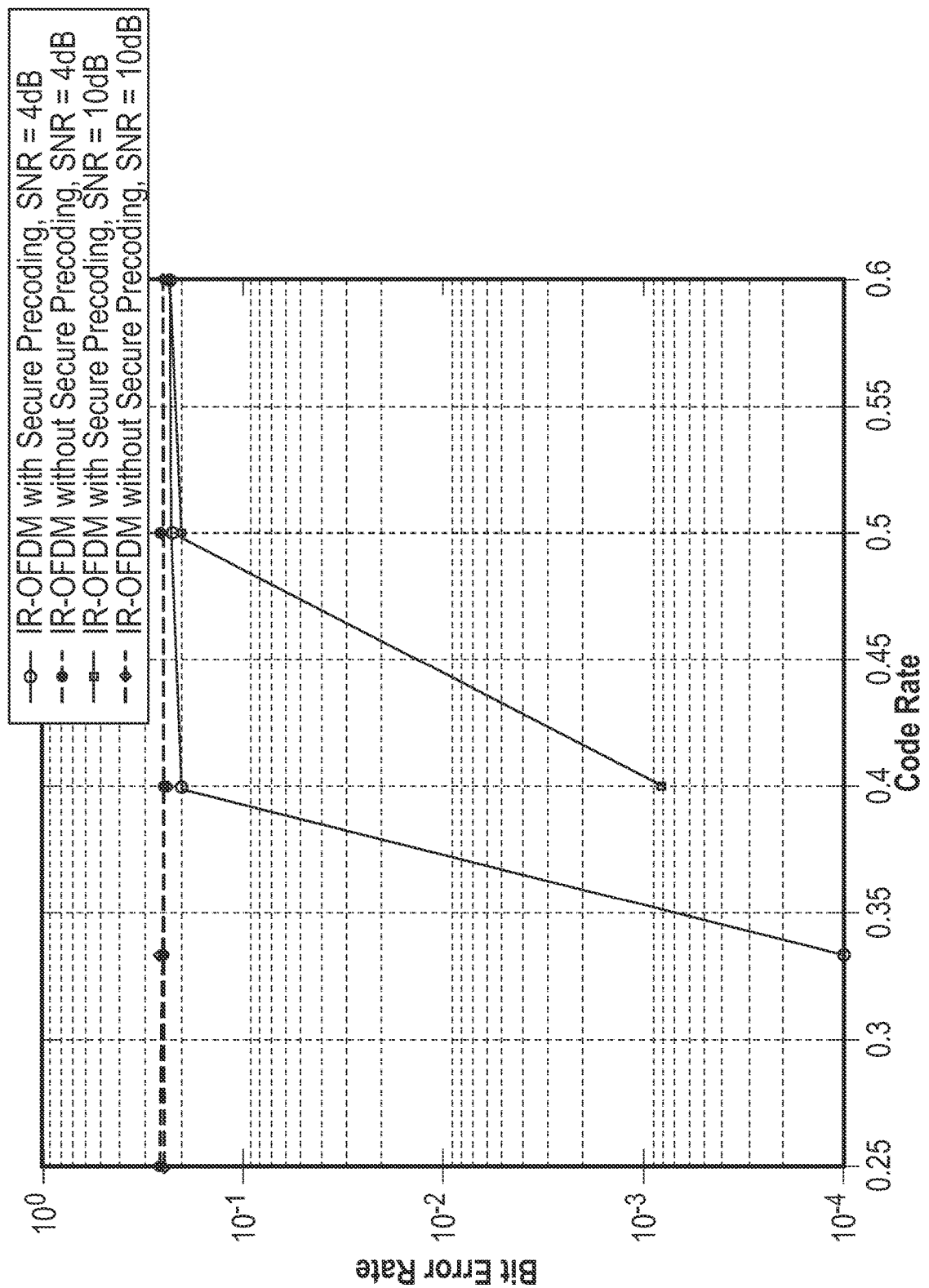
FIG. 10 is the bit error rate versus code rate for OFDM with secure precoding and without secure precoding.
Figure 11:
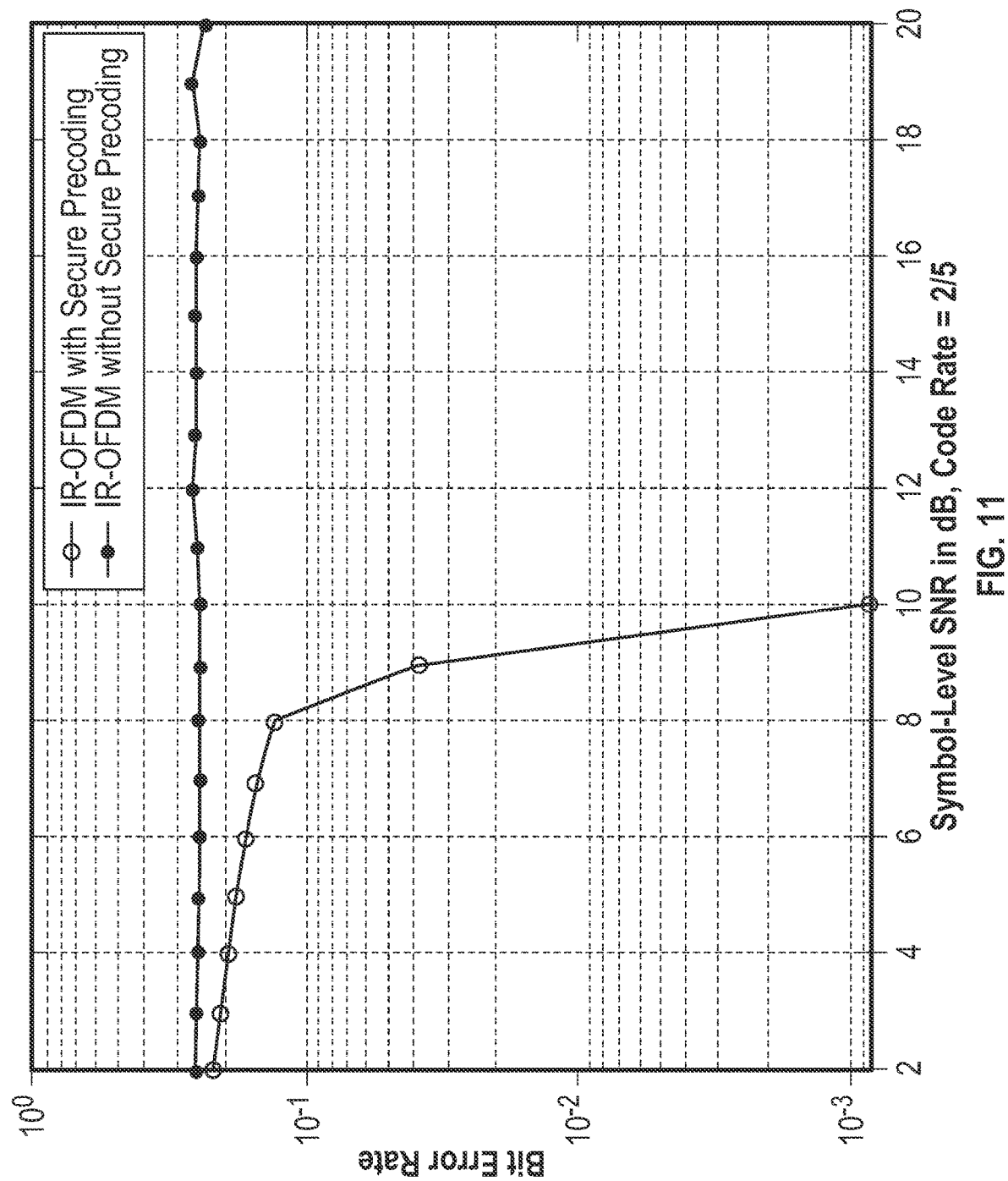
FIG. 11 is the bit error rate versus symbol-level signal to noise ratio for IR-OFDM with secure precoding and without secure precoding.
Figure 12:
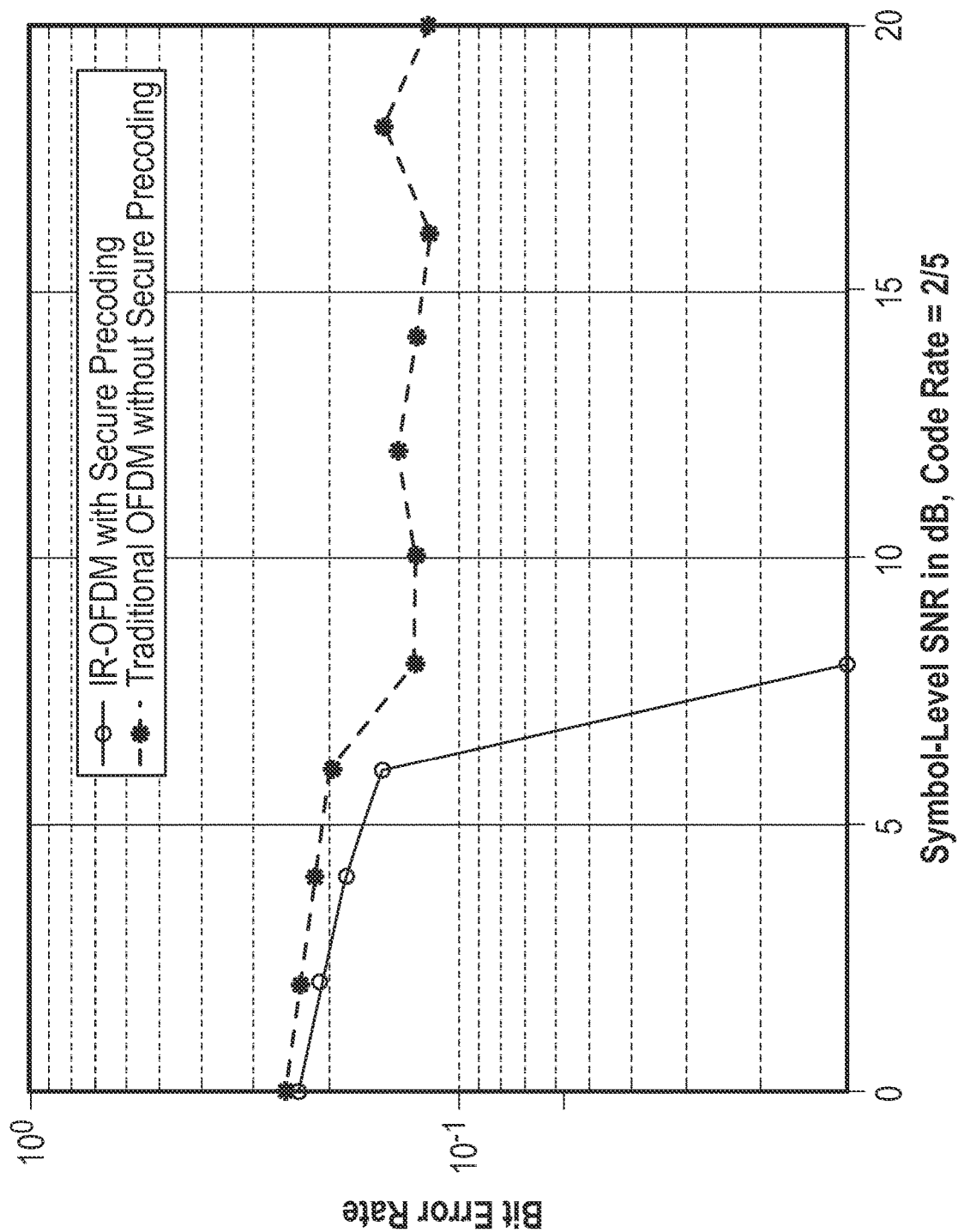
FIG. 12 is bit error rate versus symbol level signal to noise ratio for an IFFT relocated OFDM with and without secure precoding under disguised jamming over Rayleigh channels.

Referring now to FIGS. 10, 11 and 12, a performance comparison of IR-OFDM and Securely Precoded IR-OFDM under disguised jamming. In this example, we analyze the BER of IR-OFDM and securely precoded IR-OFDM under disguised jamming in both AWGN and Rayleigh channels. As in Example 2, perfect synchronization is assumed, and we use the LDPC codes for channel coding, following the DVB-S.2 standard. The signal-to-jamming ratio (SJR) is set to be 0 dB. The BER of the two systems under disguised jamming is calculated versus different SNR levels, and the result of which are shown in FIGS. 10, 11 and 12. It can be observed that: (i) under disguised jamming, in the IR-OFDM system, the BER cannot be reduced by decreasing the code rate or the noise power, which indicates that without appropriate anti-jamming procedures, IR-OFDM cannot achieve reliable communications under disguised jamming; (ii) with the securely precoded IR-OFDM scheme, BER can be significantly reduced when the code rate is sufficiently low. Therefore, the securely precoded IR-OFDM system as shown in FIG. 5 achieves a positive deterministic channel coding capacity under disguised jamming.

It is worth noting that in practical scenarios, when the jammer can estimate the channel between the jammer and the authorized user, as well as the channel between the jammer and the receiver, it is then possible for the jammer to launch disguised jamming. In other words, disguised jamming is a genuine and serious threat, and the proposed symbol-level secure precoding is a particularly effective tool to combat it. When secure precoding is combined with IR-OFDM, we obtain a secure and power-efficient communication system for next generation wireless communications, especially resource-limited IoT systems.

In conclusion, a new communication scheme, referred to as securely precoded IFFT-Relocated OFDM (SP-IR-OFDM), which aimed to break through the barriers of high PAPR in the traditional OFDM, and at the same time enhance the system security under disguised jamming. This was achieved in two steps. First, by relocating the IFFT module in traditional OFDM from the transmitter to receiver, IFFT-Relocated OFDM (IR-OFDM), essentially a single-carrier system with frequency domain equalization is provided. IR-OFDM achieves the same low PAPR with the input symbols. In particular, for constant-modulus input (such as QPSK), the PAPR can be reduced to 0 dB. IR-OFDM has a simple transceiver design and does not require selective mapping, tone reservation or constellation extension. It only needs one FFT/IFFT pair and has the same spectral efficiency as traditional OFDM. In addition, since IR-OFDM is essentially a single-carrier system, it is more robust to frequency and phase offsets than traditional OFDM, where intercarrier interference due to frequency and phase offsets is a significant challenge. Second, to combat hostile jamming, especially disguised jamming which can reduce the channel capacity to zero, we proposed to add the secure precoder and decoder to IR-OFDM, and obtained the securely precoded IR-OFDM (SP-IR-OFDM). Based on the secure randomness introduced by AES, SP-OFDM actually utilizes a dynamic constellation and breaks the symmetry between the authorized signal and the jamming interference, and therefore ensures reliable performance under disguised jamming.

The efficiency and robustness of IR-OFDM and SP-IR-OFDM are demonstrated through simulation examples. It is shown that IR-OFDM can deliver comparable or better performances than OFDM under multipath propagation. It liberates OFDM from the bottleneck of high PAPR without any additional computational complexity, storage requirement, or performance losses. Moreover, the present system achieves higher power efficiency and reduces the hardware design complexity. On the other hand, by integrating advanced cryptographic techniques into IR-OFDM transceiver design, SP-IR-OFDM can achieve strong resistance to disguised jamming while enjoying low PAPR and relatively high spectral efficiency. Note that under disguised jamming, the performance of IR-OFDM cannot be improved through channel coding, resulting in complete communication failure. When the hostile jamming if Gaussian, the performance of SP-IR-OFDM and IR-OFDM are comparable and can both be improved using strong channel coding under reasonable SJR, and the information rate is limited by Shannon's capacity formula.

Unlike traditional security techniques which mainly rely on higher layer data encryption, SP-IR-OFDM has inherent security which is built into the physical layer transceiver design and hence is also more robust under passive attacks like eavesdropping or unauthorized interception. Overall, our result indicates that, potentially, SP-IR-OFDM can serve as a promising modulation candidate for next generation secure and energy-efficient high-speed communications, especially for resource-constrained IoT network.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional modules, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python.

What is claimed is:

1. A communication system comprising:
   a first device comprising a transmitter transmitting a time domain signal comprising a plurality of symbols originating from a bitstream;
   a second device comprising a receiver receiving the plurality of symbols in the time domain, said receiver comprising,
      a fast Fourier transform module performing a fast Fourier transform on the symbols to form a frequency domain signal;
      a gain control module coupled to the fast Fourier transform module subjecting the frequency domain signal to a gain;
      an inverse fast Fourier transform module coupled to the gain control module inverse transforming the frequency domain signal to a time domain signal comprising a plurality of symbols; and
      a demapping and channel decoding module forming the bitstream from the plurality of symbols.

2. The communication system of claim 1 wherein the transmitter comprises a digital to analog converter generating an analog signal and wherein the receiver comprises an analog to digital receiver, said analog to digital converter and said digital to analog converter comprising matching operating characteristics.

3. The communication system of claim 1 wherein the received signal comprises circular convolution.

4. The communication system of claim 1 wherein the transmitter comprises a cyclic prefix addition module adding overhead bits to the transmitter signal and wherein the receiver comprises a cyclic remover module removing the cyclic prefix prior to the fast Fourier transform module.

5. The communication system of claim 1 wherein the transmitter transmits overhead bits know to the transmitter and receiver and wherein the gain control changes the gain based on the overhead bits.

6. The communication system of claim 1 wherein the plurality of symbols comprises PSK symbols.

7. The communication system of claim 1 wherein the plurality of symbols comprises QAM symbols.

8. The communication system of claim 1 wherein the transmitter comprises a secure precoder and the transmitter comprises a secure decoder.

9. The communication system of claim 8 wherein the secure precoder precodes the symbols prior to a cyclic prefix module and wherein the secure decoder decodes the time domain signal from the inverse fast Fourier transform module.

10. The communication system of claim 1 wherein the transmitter is disposed within a base station and the receiver is disposed in a first user device, said transmitter and receiver communicate a security key through a control channel.

11. A transceiver comprising:
- a transmitter transmitting a time domain signal secured with a key comprising a plurality of symbol originating from a bitstream;
- a receiver receiving a received signal comprising the plurality of symbols in the time domain, said receiver comprising,
- a fast Fourier transform module performing a fast Fourier transform on the symbols to form a frequency domain signal;
- a gain control module coupled to the fast Fourier transform module subjecting the frequency domain signal to a gain;
- an inverse fast Fourier transform module coupled to the gain control module inverse transforming the frequency domain signal to a time domain signal comprising a plurality of symbols;
- a secure decoding module decrypting the time domain signal to form a decrypted signal;
- a demapping and channel decoding module forming the bitstream from the plurality of symbols in the decrypted signal.

12. The transceiver of claim 11 wherein the transmitter comprises a digital to analog converter generating an analog signal and wherein the receiver comprises an analog to digital converter, said analog to digital converter and said digital to analog converter comprising matching operating characteristics.

13. The transceiver of claim 11 wherein the received signal comprises a circular convolution.

14. The transceiver of claim 11 wherein the transmitter comprises a cyclic prefix addition module adding overhead bits to the transmitter signal and wherein the receiver further comprising a cyclic prefix removal module removing the cyclic prefix from the time domain signal prior to the fast Fourier transform module.

15. The transceiver of claim 11 wherein the transmitter transmits overhead bits to the transmitter and receiver and wherein the gain control changes the gain based on the overhead bits.

16. The transceiver of claim 11 wherein the plurality of symbols comprises PSK symbols or QAM symbols.

17. A method of communicating comprising:
- transmitting a time domain signal comprising a plurality of symbols originating from a bitstream;
- receiving the symbols in the time domain at a receiver by comprising,
- changing the time domain signal to a frequency domain signal in a fast Fourier transform module;
- applying a gain to the frequency domain signal from a gain control module coupled to the fast Fourier transform module in the receiver;
- applying an inverse fast Fourier transform to obtain a time domain signal comprising a plurality of symbols; and
- demapping and channel decoding the time domain signal to form the bitstream from the plurality of symbols.

18. The method of claim 17 wherein communicating the time domain signal comprises communicating the time domain signal through a digital to analog converter in a transmitter and generating an analog signal and wherein the time domain is communicated to a digital to analog to digital converter, said analog to digital converter and said digital to analog converter comprising matching operating characteristics.

19. The method of system of claim 17 wherein transmitting a time domain signal comprising the plurality of symbols comprises adding overhead bits to the time domain and removing the overhead bits prior to communicating to a fast Fourier transform module.

20. The method of claim 17 wherein transmitting comprises transmitting a plurality of PSK or QAM symbols.

* * * * *